United States Patent Office 3,296,334
Patented Jan. 3, 1967

3,296,334
CONDENSATION PRODUCTS OF AN ALDEHYDE WITH SULFAMOYL AND ALKYLSULFAMOYL DERIVATIVES OF 2,2-DI(P-TOLYL)BUTANE
John C. Petropoulos, Norwalk, and Anthony T. Coscia, South Norwalk, Conn., assignors to American Cyanamid Company, New York, N.Y., a corporation of Maine
No Drawing. Original application Mar. 21, 1961, Ser. No. 97,154, now Patent No. 3,150,168, dated Sept. 22, 1964. Divided and this application Feb. 4, 1964, Ser. No. 342,515
7 Claims. (Cl. 260—849)

This invention relates to a novel class of sulfonic acid derivatives. Further, this invention relates to the sulfo, chlorosulfonyl, bromosulfonyl, sulfamoyl and alkylsulfamoyl derivatives of 2,2-di(p-tolyl)butane. Still further, this invention relates to condensation products of said sulfamoyl derivatives and to a process of producing same by reacting them with an aldehyde. And still further, this invention relates to cross-linked condensation products of said sulfamoyl derivatives and aldehydes and to a process for producing same by reacting them with various thermosetting amino resins.

One of the objects of the instant invention is to produce a novel class of sulfonic acid derivatives.

Another object of the instant invention is to produce the sulfo, chlorosulfonyl, bromosulfonyl, sulfamoyl and alkylsulfamoyl derivatives of 2,2-di(p-toluyl)butane.

Still another object of the instant invention is to produce condensation products of said sulfamoyl derivatives by reacting them with aldehydes. Finally, it is an object of the present invention to produce cross-linked condensation products by reacting them with thermosetting amino resins.

These and other objects of the present invention will become obvious to those skilled in the art upon reading the more detailed description set forth hereinbelow.

We have found that the 2,2-di(p-tolyl)butane molecule offers the advantages of relatively simple disulfonation because it contains two separated aromatic rings. By contrast, formation of compounds such as toluene disulfonic acid, involves the relatively difficult entry of a second acid group onto a deactivated ring. Consequently, sulfonation of, for example, 2,2-di(p-tolyl)butane, may be brought about under much milder conditions. The more strenuous conditions needed to sulfonate an aromatic ring which is already once sulfonated are thus avoided.

The various sulfo, chlorosulfonyl, bromosulfonyl, sulfamoyl and alkylsulfamoyl derivatives of 2,2-di(p-tolyl)butane prepared in the instant invention have the general formula (I) 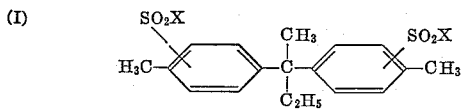

wherein X is a substituent selected from the group consisting of hydroxyl, chlorine, bromine and NHR radicals, wherein R is a substituent selected from the group consisting of hydrogen and an alkyl radical having from 1 to 8 carbon atoms.

Examples of the compounds which are encompassed by the formula, above, are 2,2-bis[4-methyl-2(or 3)-(sulfo)phenyl]butane
2,2-bis[4-methyl-2(or 3)-(chlorosulfonyl)phenyl]butane
2,2-bis[4-methyl-2(or 3)-(bromosulfonyl)phenyl]butane
2,2-bis[4-methyl-2(or 3)-sulfamoylphenyl]butane
2,2-bis[4-methyl-2(or 3) - (methylsulfamoyl)phenyl]butane
2,2-bis[4-methyl-2(or 3)-(ethylsulfamoyl)phenyl]butane
2,2-bis[4-methyl-2(or 3) - (propylsulfamoyl)phenyl]butane
2,2-bis[4-methyl-2(or 3) - (n-butylsulfamoyl)phenyl]butane
2,2-bis[4-methyl-2(or 3) - (tert.-butylsulfamoyl)phenyl]butane
2,2-bis[4-methyl-2(or 3) - (sec.-butylsulfamoyl)phenyl]butane
2,2-bis[4-methyl-2(or 3)-(amylsulfamoyl)phenyl]butane
2,2-bis[4-methyl-2(or 3)-(hexylsulfamoyl)phenyl]butane
2,2-bis[4-methyl-2(or 3)-(heptylsulfamoyl)phenyl]butane
2,2-bis[4-methyl-2(or 3)-(octylsulfamoyl)phenyl]butane The 2,2-bis[4-methyl-2(or 3)-(sulfo)phenyl] butanes of the present invention may be prepared by reacting 2,2-di(p-tolyl)butane with a sulfonating agent, such as chlorosulfonic acid or sulfuric acid, at low temperatures and in the presence of an anhydrous, inert, organic solvent, such as chloroform. Generally, temperatures within the range of about $-10°$ C. to about 30° C., preferably 0° C. to 20° C. are used. The reaction is allowed to continue for about 15 to 24 hours at atmospheric pressure. The desired 2,2-bis[4-methyl-2(or 3)-(sulfo)phenyl] butanes are then isolated. The acids are then used to prepare the other novel compounds of the present invention, as described below.

These novel sulfo acids are preferably reacted with a material such as potassium hydroxide or sodium hydroxide in water under the same conditions of temperature and pressure, as mentioned above. The reaction is carried out in an ice bath in order to maintain the temperature within the operable range since an exotherm results upon reaction of the materials. Two phases are formed, i.e., a water phase and a chloroform phase. The water phase is heated to about 212° F. and a sodium chloride solution is added thereto in amount high enough to saturate the water phase at room temperature. The dipotassium or disodium salt then crystallizes out upon cooling the solution to a temperature of about 0° C. to 30° C., and can be recovered by any convenient means, i.e., filtration. These dipotassium or disodium salts can then be used to prepare the novel halogen substituted compounds of the instant invention.

The chlorine and bromine substituted compounds, represented by the above formula, may be prepared by reacting these disodium or dipotassium salts of the 2,2-bis[4-methyl-2(or 3)-(sulfo)phenyl]butanes with a halogenating agent such as phosphorus oxychloride, phosphorus pentachloride, or their corresponding bromides. Alternatively, the chlorine and bromine compounds may be prepared by reacting the sulfophenyl compounds, represented by the above formula, with a halogenating agent, such as thionyl chloride.

The halogenating reaction is carried out by reacting the dipotassium or disodium salt with the halogenating agent in a molar ratio of at least 1:2 respectively. The two starting materials are heated, with or without the addition of an anhydrous, inert organic solvent, such as mentioned above, to a temperature within the range of about 30° to C. to about 120° C. at atmospheric pressure. The contact time depends upon the specific halogenating agent being utilized, as can be seen from the examples presented hereinbelow, but generally the reaction is completed in about one half hour to about 24 hours. The halogenated compound is then recovered by either of two methods depending upon the halogenating agent utilized. If the halogenating agent is volatile, as in the case of thionyl chloride, the reaction medium is distilled in order to drive off the excess halogenating agent. Chloroform is then added and the resulting solution is filtered and the chloroform layer is stripped, thereby isolating the halogenated product. However, if the halogenating agent is a solid, the halogenated product can be merely filtered out with sodium chloride. These halogenated compounds are also useful as intermediates and may be used to prepare the novel sulfamoyl derivatives of the instant invention.

The preparation of the sulfamoyl derivatives is carried out by reacting one of the novel halogenated sulfonyl compounds, discussed above, with a nitrogen containing material, such as ammonia or an alkyl amine.

In this process the chlorinated or brominated sulfo compound is reacted with the ammonia or amine in a molar ratio of at least 1:2 respectively, and in the presence of a hydrogen halide acceptor (e.g. additional amine) with vigorous stirring. An exotherm results, and when it is complete, as evidenced by no further rise in temperature, the reaction mixture is heated for about 15 minutes to about 4 hours on a steam bath at about 30° C. to about 150° C. at atmospheric pressure. The resulting reaction mixture is then cooled to about 0° C. to about 30° C. and neutralized with a dilute solution of a mineral acid (e.g., sulfuric acid) which causes the precipitation of the desired sulfamoyl derivative. This sulfamoyl compound can then be isolated by decantation or filtration and recrystallization from a suitable solvent. These sulfamoyl compounds may then be reacted with an aldehyde, as mentioned below, to form the novel condensation products of the present invention.

Representative of the class of alkyl amines which may be used as starting materials in the preparation of the sulfamoyl derivatives of the instant invention are methyl amine, ethyl amine, propyl amine, n-butyl amine, tert.-butyl amine, amyl amine, hexyl amine heptyl amine, octyl amine and the like.

The linear condensation products of the instant invention are prepared by condensing an aldehyde with one of the sulfamoyl compounds of the instant invention represented by the formula (II) 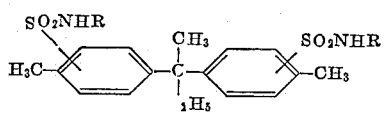

wherein R is a substituent selected from the group consisting of hydrogen and an alkyl radical having 1 to 8 carbon atoms as mentioned above.

These linear condensation products are prepared by reacting the sulfamoyl derivatives with the aldehydes in a molar ratio of from about 1:1 to about 1:3, respectively. The reaction can be carried out with or without the addition of a solvent. Depending upon the particular aldehyde selected, and/or the ultimate results desired, the solvent medium if any, can be an aqueous or an organic solvent solution. The solvent can be reactive or inert, and such compounds as water, aliphatic alcohols, e.g., butanol, aromatic hydrocarbons, e.g., xylene and mixtures thereof can be used. The reaction mixture nevertheless, is heated to a temperature within the range of about 30° C. to about 150° C. at atmospheric pressure in the presence of an acid catalyst. Any acid catalyst may be used, with compounds such as formic acid, phthalic acid, or p-toluene sulfonic acid, being preferred. The concentration of catalyst used is very small and is generally within the range of about 0.1% to about 5% (preferably 1% to 2%,) based upon the combined weight of the starting materials used.

The pH of the system is not critical, however it is usually slightly on the acidic side due to the addition of the acid catalyst. The desired condensation product can be recovered by evaporation of the solvent or it can be left in solution and used as such.

Among the aldehydes which may be used to form the condensation products with the sulfamoyl derivatives, represented by the formula above, are formaldehyde, acetaldehyde, heptaldehyde, benzaldehyde, crotonic aldehyde, acrolein, furfural and the like. The term "aldehydes" includes not only the aldehydes themselves, but also compounds engendering aldehydes; for instance, paraformaldehyde, trioxy methylene, p-aldehydes, and the like. Of these, formaldehyde is generally preferred.

Examples of the sulfamoyl derivatives which can be reacted with the aldehydes, mentioned above, are those disclosed hereinabove in columns 1 and 2.

As mentioned above, the instant invention also encompasses the formation of cross-linked sulfamoyl derivative-aldehyde condensation products. These condensation products may be cross-linked by reacting them with various thermosetting amino or alkyd resins. The cross-linking is carried out by mixing the condensation product and the cross-linking resin in a solvent for the mixture, such as methyl isobutyl ketone, methyl ethyl ketone, xylene or the like. Generally, any material which is a solvent for both the condensation product and the cross-linking resin may be used. The condensation product-cross-linking resin solution is then drawn down on a suitable surface, such as glass or tin etc. to the desired thickness and is baked in an oven at about 100° C. to about 350° C. preferably about 150° C. to about 200° C. for about 15 minutes to about 2 hours. The resulting films are very hard and transparent, thereby enabling use thereof as decorative laminates.

The amount of cross-linking resin utilized depends upon the resin which is selected for this purpose. Generally, when an amino resin, such as urea-formaldehyde or melamine-formaldehyde, is used, amounts of from about 10% to 90%, preferably about 30% to 50%, based on the weight of the condensation product, are adequate. However, when an alkyd resin is used to cross-link the condensation product, amounts of from about 10% to 90%, preferably about 60% to 80%, are necessary.

Any of the condensation products of the aldehydes and sulfamoyl derivatives, mentioned above, can be cross-linked in this manner. Among the cross-linking resins which may be used are the thermosetting amino resins, such as the aldehyde condensation products of such aldehyde-reactable compounds are urea, thiourea and ethylene diurea; aminotriazines, such as melamine, benzoquanamine, formoguanamine, acetoguanamine, ammeline, ammelide, the mono- di- ortri-alkyl melamines such as 2,4,6-triethyl-triamino-1,3,5-triazine and the alkyds such as phthalic acid-glycerine reaction products and the like. These thermosetting condensation products may also be unmodified or alcohol modified aldehyde reaction products.

The sulfo acids and their chlorosulfonyl and bromosulfonyl derivatives of the instant invention are useful, of course, as intermediates in the preparation of the sulfamoyl derivatives of the present invention. The sulfamoyl derivatives, per se, as well as the products derived therefrom particularly the aldehyde condensation products and cross-linked condensation products are useful in surface coatings, adhesives, laminates, paper coatings, textile treatment and the like. They may also be used, alone or in combination with other natural and synthetic resins, in such applications as plasticizers and coatings.

In order that the process for the preparation of the sulfo acids and, the chlorosulfonyl, bromosulfonyl and sulfamoyl derivatives of 2,2-di(p-tolyl)butane may be more fully understood, along with the preparation of the aldehyde-sulfamoyl derivative condensation products and the cross-linking thereof, the following examples are set forth. All parts and percentages are by weight unless otherwise indicated. These examples are set forth for explanation only and are by no means to be construed as limitations on the instant invention except as are indicated by the appended claims.

EXAMPLE 1

*Preparation of 2,2-bis[4-methyl-3-sulfophenyl]-butane*

Into a suitable reaction vessel equipped with thermometer and stirrer, there is introduced a solution of 123 parts of chlorosulfonic acid in 221 parts of anhydrous chloroform. The charge is cooled to 0° C. and there is slowly added a solution of 100 parts of 2,2-di(p-tolyl)butane in 129 parts of anhydrous chloroform. The mixture is vigorously stirred for approximately 3 hours. During this time, the temperature is maintained at 0 to 5° C. The solution is then stirred for approximately 16 hours at room temperature. The free 2,2-bis[4-methyl-3(sulfo)-phenyl]butane is then isolated as a hygroscopic solid by evaporation of the solvent in vacuo.

EXAMPLE 2

*Preparation of 2,2bis[4-methyl-3-sodium sulfophenyl]-butane*

53 parts of sodium hydroxide in 710 parts of water are added to a suitable reaction vessel containing a sulfo acid, produced as in Example 1 with cooling. The chloroform layer is separated and the aqueous layer is treated with 220 parts of sodium chloride at its boiling point. On cooling, the crystalline 2,2-bis[4-methyl-3-sodium sulfophenyl]butane separates from solution. This compound is collected a funnel and washed with saturated sodium chloride solution. It is then dried in an oven at 150° C. and a yield of 75% is recovered.

EXAMPLE 3

*Preparation of 2,2-bis[4-methyl-3-potassium sulfophenyl]butane*

Into a suitable reaction vessel equipped with thermometer, stirrer and reflux condenser, there is introduced 21 parts of 95.5% sulfuric acid, 23.8 parts of 2,2-di(p-tolyl)-butane, and 75 parts of carbon tetrachloride. The mixture is heated to 78° C. for approximately 2¾ hours. It is then cooled and the carbon tetrachloride layer is separated. The remaining solution is made basic with 16 parts of 85% potassium hydroxide and 200 parts of ethanol. The resultant solution is filtered, hot and the filtrate is collected and concentrated to yield white crystals of 2,2-bis[4-methyl-3-potassium sulfophenyl]butane.

EXAMPLE 4

*Preparation of 2,2 - bis[4 - methyl - 3 - (chlorosulfonyl)-phenyl]butane*

PROCEDURE A

Into a suitable reaction vessel equipped with stirrer, thermometer and reflux condenser there is added 708 parts of phosphorous oxychloride and the charge is heated to 84° C. The finally divided sodium sulfophenyl compound (prepared in Example 2) is added with stirring. The mixture is then brought to gentle reflux and is stirred for 20 hours. The excess phosphorous oxychloride is stripped on a water aspirator and the resultant mixture is stirred with 150 parts of chloroform and 210 parts of water. The chloroform layer is removed, filtered and vacuum concentrated, yielding 623 parts (82.5%) of a light amber syrup, which is the desired chlorosulfonyl compound.

EXAMPLE 5

*Preparation of 2,2 - bis[4 - methyl - 3 - (chlorosulfonyl)-phenyl]butane*

PROCEDURE B

A solution containing 23.5 parts of a sulfo acid (prepared as in Example 1) in 65 parts of choloroform, and 17.6 parts of thionyl chloride are refluxed together for 45 minutes. Most of the excess thionyl chloride is removed by vacuum distillation and the concentrated solution is treated with crushed ice. The chloroform layer is separated and washed with cold water and is dried over sodium sulfate. Evaporation of the solvent in vacuo yields the same chlorosulfonyl compound as obtained in Procedure A.

EXAMPLE 6

*Preparation of 2,2 - bis [4 methyl - 3 - (bromosulfonyl)-phenyl]butane*

PROCEDURE C

The oven dry potassium sulfonyl compound of Example 3, above, 20 parts, and 40 parts of phosphorus pentabromide are stirred together in a suitable reaction vessel during the exotherm. The paste which is formed is heated after the exotherm for one hour at 110–120° C. The volatiles are removed by vacuum distillation. The solid mass is treated with 100 parts of water and 100 parts of chloroform and the mixture heated on the steam bath for a short time. The chloroform layer is separated and dried and the solvent evaporated therefrom in vacuo. The bromosulfonyl compound is recovered.

EXAMPLE 7

*Preparation of 2,2-bis[4-methyl-3-sulfamoylphenyl]butane*

Into a suitable vessel equipped with a stirrer there is added 623 parts of the chlorosulfonyl compound prepared according to Procedure A, above, and 900 parts of a 28% aqueous ammonia solution. The mixture is heated on a steam bath for three hours with constant stirring. It is then cooled in an ice bath and neutralized with dilute sulfuric acid. A solid product is recovered (in a 71% yield) which melts at 212° C. to 213° C. Recrystallization from ethanol gives white crystals melting at 216° C. to 217.5° C. The compound is analyzed to be 2,2-bis[4-methyl-3-sulfamoylphenyl]butane.

EXAMPLE 8

*Preparation of 2,2 - bis[4 - methyl - 3 - (butylsulfamoyl)-phenyl]butane*

Into a suitable reaction vessel equipped with thermometer, stirrer and reflux condenser there is added 50 parts by weight of a 10% aqueous solution of potassium hydroxide and 20 parts of n-butylamine. To this mixture there is added slowly 7 parts of the chlorosulfonyl compound described above, in Examples 4 and 5. The mixture is then refluxed for about ½ hour and the excess butylamine is removed by steam distillation. Dilute sulfuric acid is added to the mixture until a sticky solid mass precipitates. The sticky solid mass is recovered, dissolved in hot heptane and then cooled. A white gum precipitates which is 2,2-bis-4-methyl-3-(butylsulfamoyl)phenyl butane.

EXAMPLE 9

*Preparation of 2,2 - bis[4 - methyl - 3 - (octylsulfamoyl)-phenyl]butane*

The procedure of Example 8 was again followed except that 24 parts of octyl amine was substituted for the n-butyl amine of Example 8. After precipitation and filtration a white resinous material is recovered. The material is shown by analysis to be 2,2-bis[4-methyl-3-(octylsulfamoyl)phenyl]butane.

EXAMPLE 10

*Preparation of a sulfamoyl derivative-aldehyde condensation product and cross-linking thereof*

Into a suitable reaction vessel equipped with thermometer, stirrer and water trap, there is introduced a mixture of 10 parts of 2,2-bis(4-methyl-3-sulfamoylphenyl)butane, 1.6 parts of 95% para-formaldehyde, 15 parts of butanol and 10 parts of xylene. The charge is made acidic by addition of a small amount of formic acid and is then heated at reflux for about 1 hour. Some of the volatile material is removed by distillation so that the product is reduced to about 75% solids. This resinous condensation product is then recovered and mixed with 1 part of a 1:3 urea-formaldehyde resin. A film of this mixture is drawn down on glass and is baked 30 minutes at 300° F. The resultant cured film is transparent and very hard.

EXAMPLE 11

Into a suitable reaction vessel equipped with reflux condenser, there is introduced a mixture of 10 parts of 2,2 - bis[4 - methyl - 3 - (butylsulfamoyl)phenyl]butane, 5 parts of a 37% aqueous formalin solution, 100 parts of benzene and 100 parts of ethanol. The pH of the formalin solution is adjusted to aproximately 8.0 before mixing by addition of dilute sodium hydroxide. The charge is heated at reflux for one hour during which time the formaldehyde content is determined by titration of an appropriate aliquot with sodium sulfite. After about 4 parts of the formaldehyde have reacted with the sulfamoyl derivative (about 1 hour) the solution is concentrated to yield an amorphous solid. The resin is taken up in methylisobutylketone and is mixed with 1 part of a 1:5 melamineformaldehyde resin. A film is drawn and baked on glass for 30 minutes at 300° F. The resultant cured film is very hard and transparent.

EXAMPLE 12

3 Parts of sulfamoyl derivative-aldehyde condensation product, produced as in Example 10, is mixed with 7 parts of a phthalic acid-glycerine-lauric acid (45%:25%:30%) alkyd resin. A film is drawn and baked on glass for 45 minutes at 325 °C. The resultant cured film is very hard and transparent.

This application is a divisional application of copending application, Serial No. 97, 154, filed March 21, 1961.

We claim:

1. A process for the preparation of a condensation product which comprises condensing (A) formaldehyde and (B) a compound having the formula

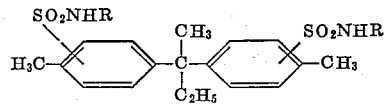

wherein R is a substituent selected from the group consisting of hydrogen and an alkyl radical having from 1 to 8 carbon atoms at a temperature ranging from about 30° C. to about 150° C., in the presence of from about 0.1% to about 5.0%, by weight, based on the combined weight of (A) and (B), of an acid catalyst, and at a molar ratio of (B) to (A) of from about 1:1 to about 1:3, respectively.

2. A process for the preparation of a condensation product which comprises condensing (A) formaldehyde and (B) a compound having the formula

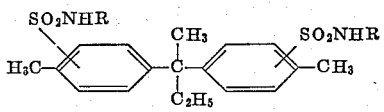

wherein R is a substituent selected from the group consisting of hydrogen and an alkyl radical having 1 to 8 carbon atoms at a temperature ranging from about 30° C. to about 150° C., in the presence of from about 0.1% to about 5.0%, by weight, based on the combined weight of (A) and (B), of an acid catalyst, and at a molar ratio of (B) and (A) of from about 1:1 to about 1:3, respectively.

3. A process for the preparation of a condensation product which comprises condensing (a) formaldehyde and (B) 2,2-bis(4-methyl-3-sulfamoyl-phenyl)butane at a temperature ranging from about 30° C. to about 150° C., in the presence of from about 0.1% to about 5.0%, by weight, based on the combined weight of (A) and (B), of an acid catalyst, and at a molar ratio of (B) to (A) of from about 1:1 to about 1:3, respectively.

4. The resinous condensation reaction product produced by condensing (A) an aldehyde and (B) a compound having the formula

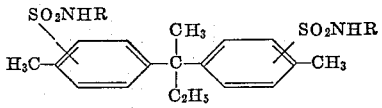

wherein R is a substituent selected from the group consisting of hydrogen and an alkyl radical having 1 to 8 carbon atoms at a temperature ranging from about 30° C. to about 150° C., in the presence of from about 0.1% to about 5.0%, by weight, based on the combined weight of (A) and (B), of an acid catalyst, and at a molar ratio of (B) to (A) of from about 1:1 to about 1:3, respectively.

5. The resinous condensation reaction product produced by condensing (A) formaldehyde and (B) 2,2-bis(4-methyl-3-sulfamoylphenyl)butane at a temperature ranging from about 30° C. to about 150° C., in the presence of from about 0.1% to about 5.0%, by weight, based on the combined weight of (A) and (B), of an acid catalyst, and at a molar ratio of (B) to (A) of from about 1:1 to about 1:3, respectively.

6. A process for the production of a cross-linked condensation product which comprises reacting the condensation product produced by condensing (A) an aldehyde and (B) a compound having the formula

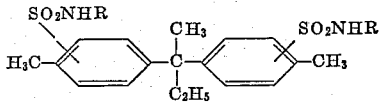

wherein R is a substituent selected from the group consisting of hydrogen and an alkyl radical having 1 to 8 carbon atoms at a temperature ranging from about 30° C. to about 150° C., in the presence of from about 0.1% to about 5.0%, by weight, based on the combined weight of (A) and (B), of an acid catalyst, and at a molar ratio of (B) to (A) of from about 1:1 to about 1:3, respectively with a thermosetting resin at a temperature ranging from about 120° C. to about 350° C. and for from about 15 minutes to about 2 hours.

7. A cross-linked resinous reaction product produced by reacting the resinous reaction product produced by condensing (A) formaldehyde and (B) 2,2-bis(4-methyl-3-sulfamoylphenyl)butane at a temperature ranging from about 30° C. to about 150° C., in the presence of from about 0.1% to about 5.0%, by weight, based on the combined weight of (A) and (B), of an acid catalyst, and at a molar ratio of (B) to (A) of from about 1:1 to about 1:3, respectively with a thermosetting resin selected from the group consisting of urea-formaldehyde, melamineformaldehyde and alkyd resins at a temperature ranging from about 120° C. to about 350° C. and for from about 15 minutes to about 2 hours.

References Cited by the Examiner

UNITED STATES PATENTS 2,160,196  5/1939  Bruson et al. _____ 260—849

MURRAY TILLMAN, *Primary Examiner.*

GEORGE F. LESMES, *Examiner.*

J. C. BLEUTGE, *Assistant Examiner.*